Figure 1:
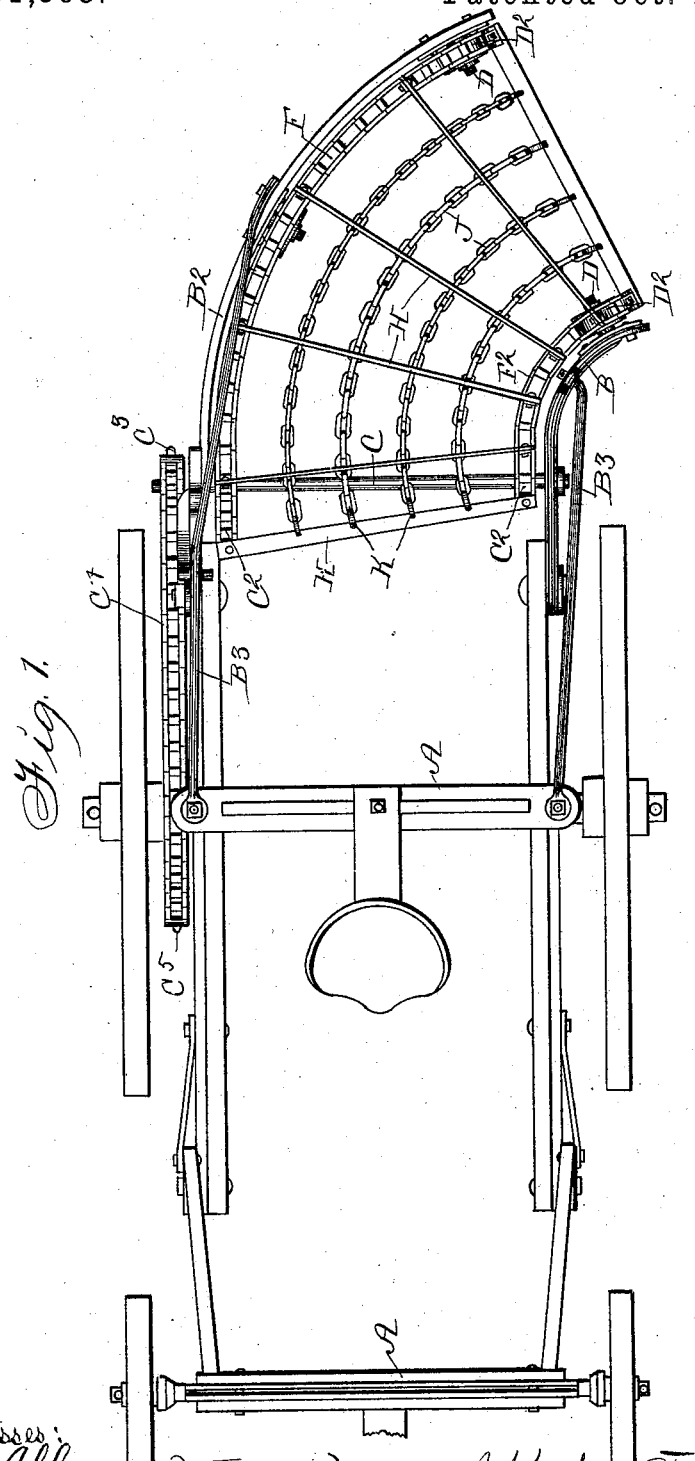

(No Model.) 3 Sheets—Sheet 1.

A. T. DOWDEN.
SEGMENTAL CONVEYER FOR POTATO HARVESTERS.

No. 591,388. Patented Oct. 12, 1897.

Witnesses: George Allan, W. J. Tansley
Inventor: Ashford T. Dowden,
By Thomas G. and J. Ralph Orwig, Attorneys.

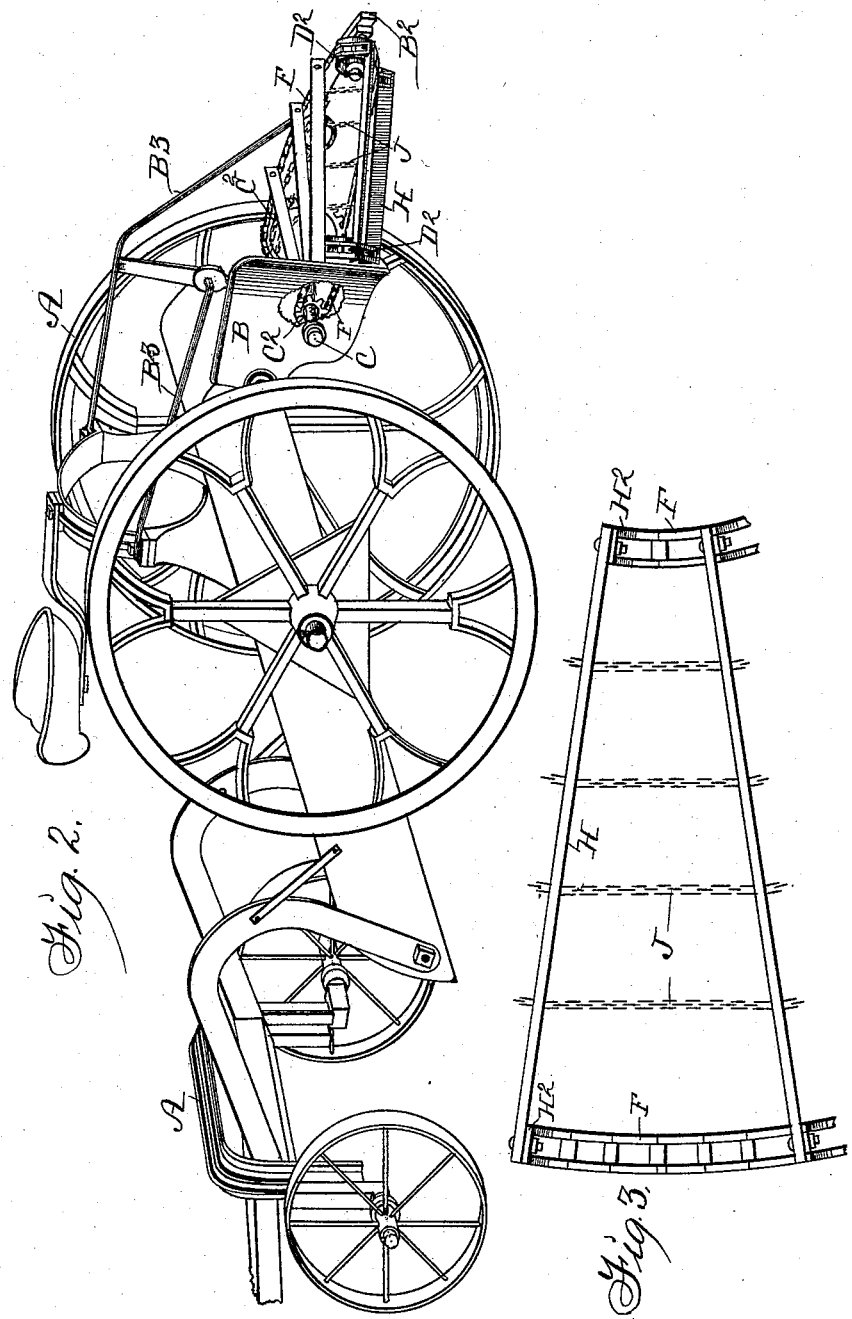

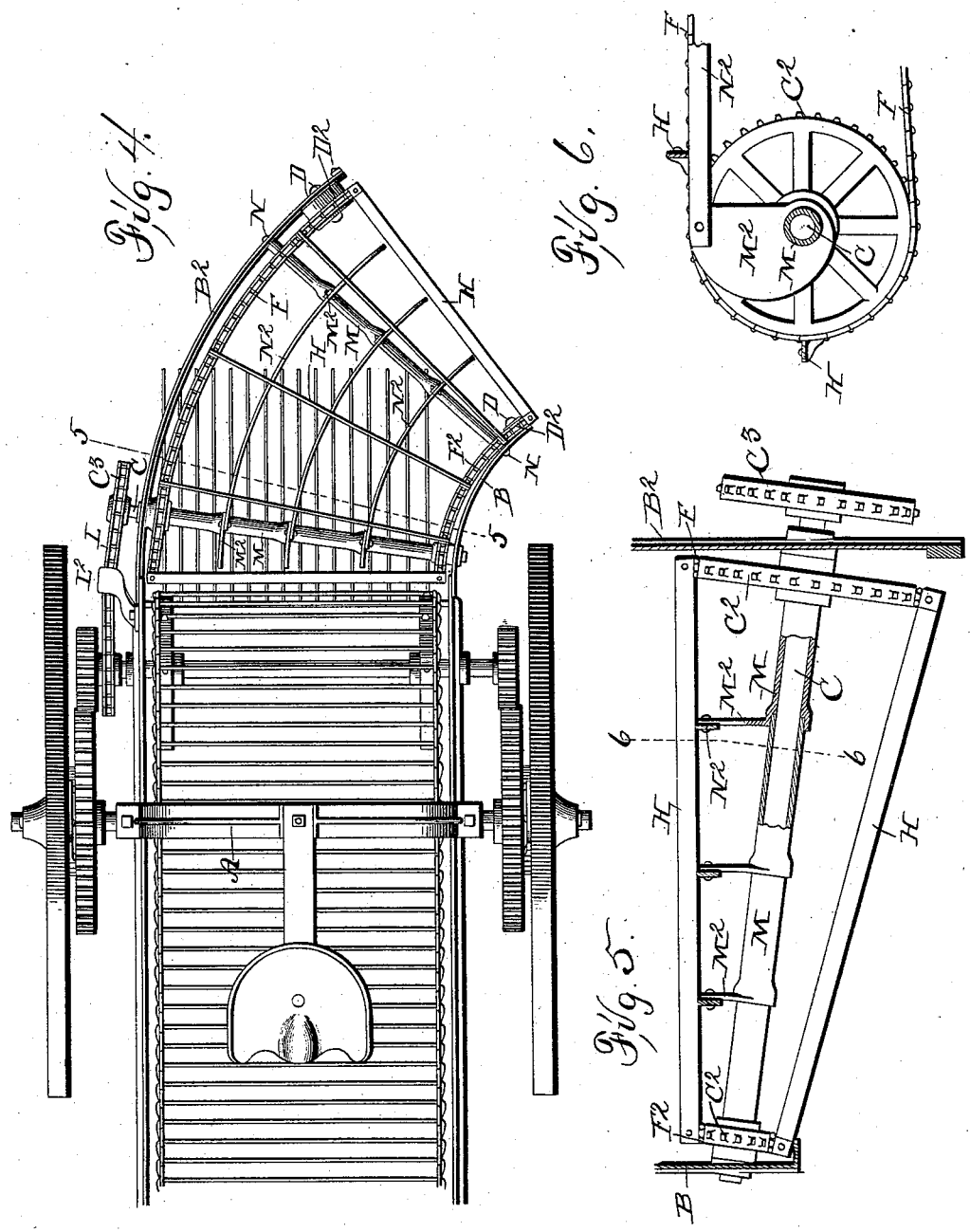

UNITED STATES PATENT OFFICE.

ASHFORD T. DOWDEN, OF PRAIRIE CITY, IOWA.

SEGMENTAL CONVEYER FOR POTATO-HARVESTERS.

SPECIFICATION forming part of Letters Patent No. 591,388, dated October 12, 1897.

Application filed October 12, 1896. Serial No. 608,683. (No model.)

*To all whom it may concern:*

Be it known that I, ASHFORD T. DOWDEN, a citizen of the United States of America, residing at Prairie City, in the county of Jasper and State of Iowa, have invented a new and useful Segmental Conveyer for Potato-Harvesters, &c., of which the following is a specification.

The object of this invention is to provide a simple, cheap, strong, and durable conveyer designed to be connected with and operated by power derived from the traction-wheels of a potato-harvester or the like to receive stalks and other refuse from the potato-screening mechanism and discharge it at the side of the machine.

My invention consists in certain details in the construction of the conveyer and in the arrangement and combination thereof with the potato-harvester, as hereinafter fully set forth, pointed out in my claims, and illustrated in the accompanying drawings, in which—

Figure 1 is a top or plan view of the harvester-frame, showing the conveyer attached thereto. Fig. 2 is a perspective view of the same. Fig. 3 is a plan view of a section of the conveyer. Fig. 4 shows a top or plan view of a harvester and my preferred form of conveyer. Fig. 5 shows a transverse section, on an enlarged scale, through the line 5 5 of Fig. 4. Fig. 6 shows a section through the line 6 6 of Fig. 5.

The frame and running-gear of the machine is illustrated diagrammatically, for the reason that any common form may be used and the frame as illustrated shows the position of the conveyer relative to the machine. The frame and running-gear considered as a whole is indicated by the reference-letter A.

B and $B^2$ indicate two extensions of the frame designed to serve as supports for the conveyer. They are bolted or otherwise secured to the rear end of the frame A and are curved in the same direction laterally. The outer end portion of each is supported by a rod $B^3$, connected with the machine-frame. The extension B is enlarged vertically to serve as a guide.

C indicates a shaft rotatably mounted in the forward ends of the parts B and $B^2$ and having two sprockets $C^2$ keyed to its end portions between the said extensions. A sprocket $C^3$ is fixed to the outer end of the shaft, and a chain $C^4$ engages said sprocket and also a sprocket $C^5$, fixed to the axle of the driving-wheels. Hence when the mechanism is advanced the shaft C is rotated.

Stub-axles D are fixed in the rear ends of the extensions B and $B^2$ and sprocket-wheels $D^2$ loosely mounted thereon. A like sprocket-wheel is supported in the central portion of the part $B^2$.

F indicates a sprocket-chain passed around the sprockets secured to the part $B^2$, and $F^2$ is a like chain much shorter than the chain F, passed around the sprockets on the part B.

H indicates a plurality of metal cross-pieces fixed at equidistant points to the outer chains F and $F^2$. The bars are flat and are secured in position with their edges up by being fixed to the blocks $H^2$, connected with the links of the sprockets. This is done to support a series of chains J, that are extended longitudinally of the conveyer and are supported at equal distances apart by means of open links K, connected with the edges of the cross-pieces and with the links of the chains. The chains and cross-pieces thus connected form a conveyer that will carry vines, weeds, and other refuse to the rear and side of the machine, the conveyer being located where it will receive said refuse from the potato-screening machinery of the harvester.

In my preferred form (illustrated in Sheet 3) the shaft C, at the forward end of the conveyer, to which power is applied, is mounted in the side pieces B and $B^2$. It is, however, inclined at such an angle that the forward upper corners of the large and small sprocket-wheels $C^2$ will be in horizontal alinement and at right angles to the machine-frame. Power is applied to this shaft C through a sprocket-chain L, which must, of course, be somewhat twisted to properly engage the sprocket-wheel $C^3$ on the end of the shaft C. A guide $L^2$ is provided to hold the chain in place. In this preferred form the conveyer composed of the chains $F^2$ and cross-pieces H is constructed and operated in substantially the same manner as in the form previously described. However, the chains J are dispensed with and in their stead I have provided stationary bars on which the cross-strips of the conveyer rest.

On the shaft C, I have placed a number of cast-metal sleeves M, each having an upright M² thereon. The ends of these sleeves are telescoped to tightly inclose the shaft and exclude dust, &c. Near the outer end of the conveyer-frame is a cross-bar N, upon which a like number of similar sleeves are mounted. The bars N² are bolted to the uprights on said sleeves and are in position to be engaged by the cross-pieces of the conveyer when they reach the top of the sprocket-wheels and to support the conveyer to the rear end of its movement. It is obvious that by arranging the front shaft C at the angle shown stalks and other refuse may be received from the conveyer of the digger without danger of dropping between the two conveyers and that the stalks and refuse will be thrown on the ground to one side of the row of potatoes.

Having thus described my invention, what I claim as new therein, and desire to secure by Letters Patent of the United States therefor, is—

1. A segmental conveyer, comprising a curved frame, a shaft rotatably mounted therein, means for rotating the shaft, two sprocket-wheels mounted on the ends of the said shaft, two sprocket-wheels loosely mounted on the opposite end of said frame, one or more sprocket-wheels loosely mounted on the outer side of the frame between the aforesaid sprockets, a sprocket-chain connecting the outer sprockets, and a sprocket-chain connecting the inner sprockets, cross-pieces secured to the sprocket-chains, and chains connecting the said cross-pieces, for the purposes stated.

2. A segmental conveyer, comprising a curved frame, two sprocket-wheels mounted in one end of the frame to rotate in a vertical plane, two sprockets mounted in the other end to rotate in a vertical plane at a considerable angle relative to the other sprockets, two chains passed around the sprocket-wheels, cross-pieces for connecting the chains and means for rotating the sprocket-wheels, and guides fixed to the segmental frame to engage the longer chain and cause it to travel in a segment, for the purposes stated.

3. A side-delivery conveyer for potato-harvesters, comprising a segmental frame supported at the rear of the harvester, a shaft rotatably mounted therein and inclined downwardly and rearwardly at one end, a large sprocket-wheel on one end of the shaft and a small sprocket on the other end, two sprocket-wheels loosely mounted at the rear end of the frame, two sprocket-chains passed over said sprocket-wheels, cross-bars connecting the sprocket-chains, a cross-piece at the rear end of the segmental frame, a series of collars having integral uprights thereon placed on said shaft and cross-piece and straight bars bolted to said uprights to serve as a track for the conveyer for the purpose stated.

ASHFORD T. DOWDEN.

Witnesses:
H. C. GILL,
D. H. GILL.